Sept. 11, 1956  J. W. JACOBS  2,762,888
REFRIGERATING APPARATUS
Filed Sept. 10, 1953  7 Sheets-Sheet 1

INVENTOR.
James W. Jacobs
BY R. K. Candor
His Attorney

Sept. 11, 1956 J. W. JACOBS 2,762,888
REFRIGERATING APPARATUS
Filed Sept. 10, 1953 7 Sheets-Sheet 2

INVENTOR.
James W. Jacobs
BY R R Landor
His Attorney

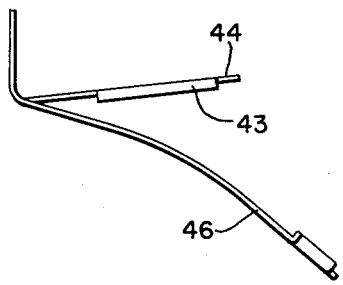
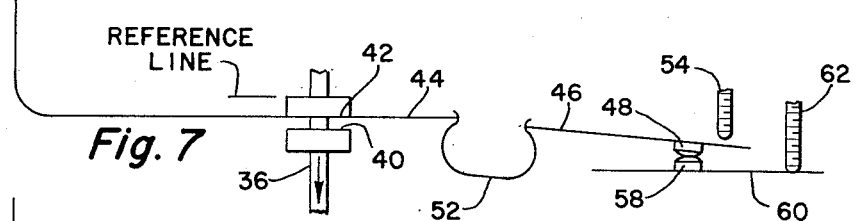
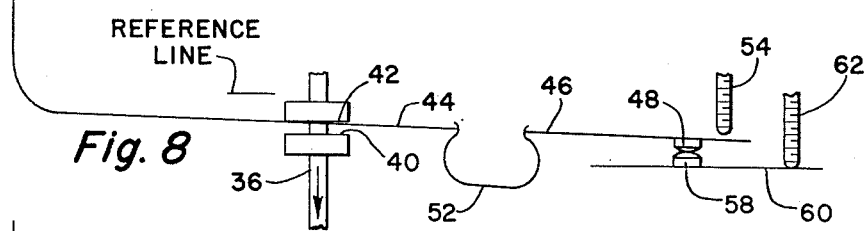
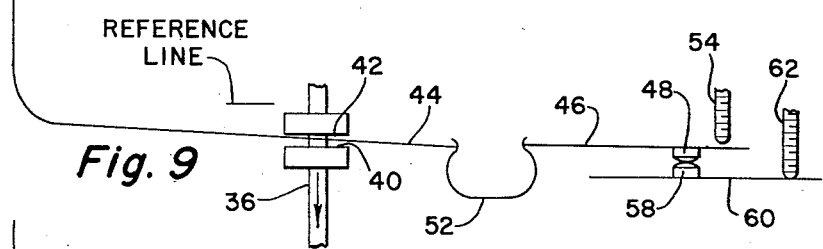
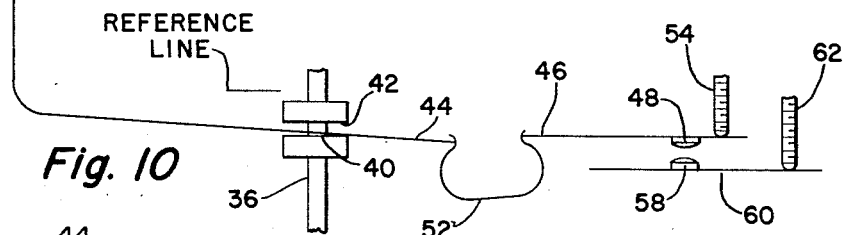
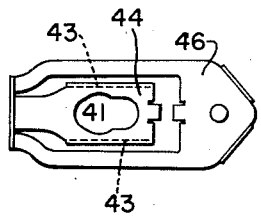

Sept. 11, 1956     J. W. JACOBS     2,762,888
REFRIGERATING APPARATUS

Filed Sept. 10, 1953     7 Sheets-Sheet 4

INVENTOR.
James W. Jacobs
BY
His Attorney

Sept. 11, 1956   J. W. JACOBS   2,762,888
REFRIGERATING APPARATUS
Filed Sept. 10, 1953   7 Sheets-Sheet 5

INVENTOR.
James W. Jacobs
BY R R Candor
His Attorney

Sept. 11, 1956 J. W. JACOBS 2,762,888
REFRIGERATING APPARATUS
Filed Sept. 10, 1953 7 Sheets-Sheet 6

INVENTOR.
James W. Jacobs
BY R. K. Cantor
His Attorney

Sept. 11, 1956   J. W. JACOBS   2,762,888
REFRIGERATING APPARATUS
Filed Sept. 10, 1953   7 Sheets-Sheet 7

*INVENTOR.*
James W. Jacobs
BY R R Candor
*His Attorney*

United States Patent Office 2,762,888
Patented Sept. 11, 1956

2,762,888

REFRIGERATING APPARATUS

James W. Jacobs, Dayton, Ohio, assignor to General Motors Corporation, Detroit, Mich., a corporation of Delaware Application September 10, 1953, Serial No. 379,420

10 Claims. (Cl. 200—140)

This invention relates to refrigerating apparatus and more particularly to temperature responsive volatile liquid actuated switches and their association with a wide variety of refrigeration applications.

It is an object of my invention to provide a small compact inexpensive temperature responsive volatile liquid actuated switch which with slight changes in parts and manufactring can be used for a wide variety of refrigeration applications.

It is another object of my invention to provide a small compact temperature responsive volatile liquid actuated switch with which slight changes in parts and manufacturing can be used at almost any temperature desired from low to high with almost any desired differential from narrow to wide.

It is another object of my invention to provide a small compact inexpensive temperature responsive volatile liquid actuated switch which is easy to manufacture and assemble and which remains in calibration even when treated roughly.

It is another object of my invention to provide a small compact inexpensive temperature responsive volatile liquid actuated switch having excellent snap-action and a long life and high maximum current carrying capacity for example over 1 H. P.

It is another object of my invention to provide a two temperature refrigerator having its freezing and higher temperature evaporators connected in series with a control having normal, lower and higher temperature adjustments which will be similarly effective to change the freezing and unfrozen food compartment temperatures under cold as well as normal and hot environment temperatures.

These and other objects are attained in the form shown in the drawings by employing a high pressure volatile liquid and a thin diaphragm which may be made of different thicknesses. Through a follower of electrical insulating material and a lost motion the tongue of a toggle snap-action blade mechanism is operated. The contact portion of this blade mechanism is sprung downwardly to keep it in engagement with the normally stationary contact so that this together with the lost motion connection provides satisfactory contact pressure up to the time of toggling. The tongue of the blade mechanism is sprung in the opposite direction to eliminate any hesitation in the snap-action. The expansion of the diaphragm is opposed by the range spring which may be made in various sizes of wire to provide different rates for different applications. This range spring is adjusted by a knob through an adjustable threaded connection. This threaded connection may be provided with threads of different pitch and leads to provide different ranges of adjustment. The connection is provided with a cam arm for engaging and holding the movable contact in the open circuit position. The location of the stationary contact is made adjustable and a second adjustment is provided for limiting the open circuit position of the movable contact. A simple alarm switch is also provided.

Further objects and advantages of the present invention will be apparent from the following description, reference being had to the accompanying drawings wherein a preferred form of the invention is clearly shown.

In the drawings:

Figure 6 is a side view of the toggle blade and tongue in its unstressed and unconfined state;

Figure 7 is a diagrammatic view showing the blade mechanism in the open contact closed position at the start of the opening movement;

Figure 8 is a similar view with the blade approaching the snap-action condition;

Figure 9 is a similar view showing the instantaneous position of the tongue during the beginning of the snap-action;

Figure 10 is a similar view showing the position of the blade and the contact at the completion of the opening movement;

Figure 22 is a plan view of the toggle blade and tongue.

Figure 1:
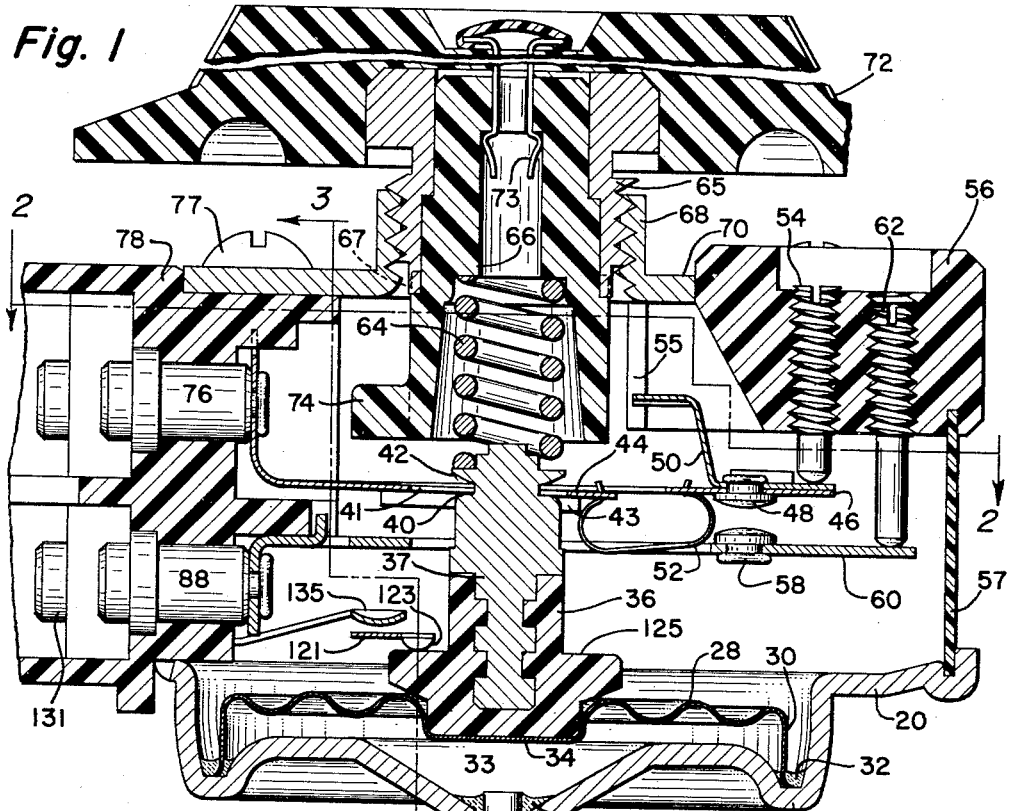
Figure 1 is a greatly enlarged vertical sectional view of a switch embodying one form of my invention taken along the line 1—1 of Figure 2.

Referring now to the drawings and more particularly to Figure 1 there is shown a refrigerator switch including the metal base 20 provided with an annular groove 22 and a depressed central portion 24 concentric with the groove 22. Connecting with and sealed to the central portion 24 by solder or other suitable method is a capillary tube 26 which may be connected to any suitable source of control pressure or it may be provided with a volatile liquid preferably monochlorodifluoromethane (F–22) which has a relatively high pressure throughout the refrigerating range so that it is not greatly affected by changes in atmosphere pressure. For water and beverage coolers, the capillary tube may be charged with dichlorodifluoromethane (F–12) having a lower pressure than F–22. A thin metal diaphragm 28 is provided with concentric corrugations and has a downwardly turned flange 30 extending into the groove 22. This diaphragm 28 is preferably made of beryllium copper with a thickness of 0.008 inch for the switch as made according to the temperature scale in Figure 17 for installation in the type of refrigerator shown in Figure 14. It is made with a thickness of 0.010 inch for the switch as made according to the temperature scale of Figure 20 for installation in the type of refrigerator shown in Figure 13. It is made with a thickness of 0.007 inch for the switch as made according to the temperature scale of Figure 21. For another application it is made with a thickness of 0.011 inch. The bottom of this flange 30 is curled outwardly and sealed by molten solder 32 which forms an air tight seal providing a sealed diaphragm chamber 33 communicating with the adjacent end of the capillary tube 26. The diaphragm 28 is provided with a depressed center portion 34.

The depressed central portion 34 of the diaphragm 28 receives a projection at the lower end of a diaphragm follower 36 which is formed of some suitable electrical insulating material such as phenylformaldehyde resin. The diaphragm follower 36 is provided with a metal insert having reduced upper portion having spaced shoulders 40 and 42. Freely movable between the spaced shoulders is the tongue 44 in the form of an inner spring blade of 0.010 inch beryllium copper sheet. This tongue has a keyhole 41 through which the shoulder 42 is passed to place the tongue 44 between these shoulders 40 and 42. Adjacent the keyhole, this tongue 44 is provided with stiffening side flanges 43. This tongue 44 is surrounded by a second spring blade 46 formed of the same sheet as is better shown in Figure 22. The blade 46 and the tongue 44 are joined together adjacent the angular terminal 76 to which they are riveted. The tongue 44 and the spring blade 46 are made of a single piece of thin metal having a slot 45 extending around the tongue and terminating on either side of the base of the tongue directly adjacent the terminal 76. In the unstressed unconfined state illustrated in Figure 6, the tongue extends upwardly at an angle of 6° while the blade 46 extends gradually down to an angle of about 35°. The terminal 76 is mounted in a terminal block 78 of electrical insulating material. This terminal block 78 is located between the flanged U-shaped top plate 70 and the metal base 20. It is held in place by the screws 77. The top plate 70 is fastened to the base 20 by the screws 71 which extend through the flanges of the top plate 77 and thread into the adjacent portions of the metal plate 20.

Figure 4:
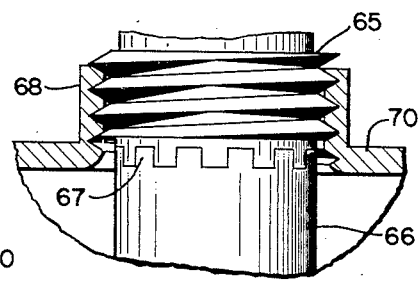
Figure 4 is a view in elevation of the adjusting screw and spring retainer as shown in Figure 1.

The expansion of the diaphragm 28 is opposed by a compression type coil spring 64 provided within the interior of a spring retainer 66. Similar coil springs having different wire diameters and different rates may be substituted for the spring 64 for different applications. A shoulder extending around the intermediate portion of the spring retainer 66 is provided with square teeth 67 as is better shown in Figure 4. These square teeth 67 are intermeshed with complementary square teeth provided on the lower end of an adjusting screw 65. This makes it possible to shift the adjusting screw 65 relative to the spring retainer so that any desired adjustment of the range spring 65 may be made in any angular position of the knob. The knob 72 is provided with a hexangular recess which receives the hexangular head of the screw 65.

The knob 72 is held on the hex head of the screw 65 by the spring clip 73 which extends through apertures in the knob 72 and the spring retainer 66 and has its lower end retained by a shoulder in the retainer 66 as shown in Figure 1.

The end of the blade 46 carries an arm 50 which is riveted to it by the contact 48. This arm 50 is adapted to cooperate with the cam arm 74 provided upon the spring retainer 66 in such a location as to enter into camming relationship with the arm 50 in one limit of rotation to hold the arm 50 in its uppermost position against the adjusting screw 54. The adjusting screw 54 is threaded through a block 56 of an electrical insulating material which may be the same material as that of the terminal block 78. This block 56 may be held by the top plate 70. This block 56 has a groove for holding in place the end wall 57 of the enclosure. The end of the tongue 44 is connected by a C-shaped toggle spring 52 with the adjacent portion of the blade 46. When the tongue 44 is lifted by the shoulder 40 of the follower 36 the blade 46 will snap downwardly as soon as the upward force of the C-shaped toggle spring 52 becomes less than the spring force of the blade 46. In its unstressed state the tongue 44 and the blade 46 take the approximate shape shown in Figure 6 so that under conditions of operation the tongue 44 always has an upward force and the blade 46 always has a downward force. When this blade 46 overcomes the force of the toggle spring 52 and moves downwardly to carry the contact 48 into engagement with the normally stationary contact 58, it has sufficient spring force to maintain adequate contact pressure between it and the stationary contact 58 to assure good current carrying capacity. The upward force of the tongue 44 assures sharp snap-action without hesitation from one position to another.

Figure 5:
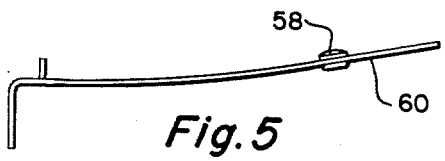
Figure 5 is a view of the stationary contact and spring arm in its unstressed state.

The contact 58 is riveted to the contact carrying blade 60 having the shape in the unstressed state shown in Figure 5. This contact blade 60 is anchored to a terminal 88 embedded in the terminal block 78 beneath the terminal 76. It is sprung upwardly against the pin at the lower end of the adjusting screw 62 which is threaded through the block 56 of electrical insulating material. The adjustment of the screw 62 determines the location of the normally stationary contact 58. The spring force of the blade 60 is great enough to hold it against the pin of the screw 62 at all times. However, if desired, this blade 60 may be made resilient enough to yield slightly under the impact of the engagement of the movable contact 48 with the normally stationary contact 58. The block 56 is provided with a projection 55 which is located so as to serve as a stop to prevent the complete rotation of the cam arm 74 of the spring retainer 66.

When the switch contacts 48 and 58 are closed the refrigeration system is energized so that the capillary tube 26 is cooled and the volatile liquid therein has its pressure reduced. This causes the diaphragm 28 as well as the follower 36 and the shoulders 40 and 42 to move downwardly from the position shown in Figure 7 progressively to the positions shown in Figures 8, 9 and 10. In Figure 8 the follower 36 and its shoulder 42 are in engagement with the upper surface of the tongue 44 and have moved the tongue 44 downwardly until the C-shaped toggle spring is approaching the position of having its pivot points in alignment with the tongue 44. In an ordinary switch this would cause the contact pressure between the contacts 48 and 58 to be reduced substantially to the zero point. However, in the present switch by having the blade 46 shaped in its unstressed state, as shown in Figure 6, its inherent spring force in the position shown in Figure 8 is more than enough to maintain the contact pressure between the contacts 48 and 58.

A slight further downward movement to the position shown in Figure 9 carries the tongue 44 and the C-shaped toggle spring 52 across the dead center position. In this movement across dead center, because of the lost motion connection between the follower 36 and the tongue 44, this snapping of the toggle elements 44 and 52 down does not impose any upward force on the blade 46 until they are rapidly in motion and the tongue 44 engages the lower shoulder 40 at which time the blade 46 has a sudden upward force applied thereto which is great enough to overcome the spring force inherent in the blade 46 and great enough to rapidly separate the contacts 48 and 58. This carries the blade into contact with the pin on the lower end of the adjustable stop screw 54. In this way contact pressure adequate in amount is maintained until the contacts are suddenly separated. This insures that a relatively high current rating can be obtained since arcing is minimized by this particular set up of the contact forces and the contact separation arrangement.

Figure 3:
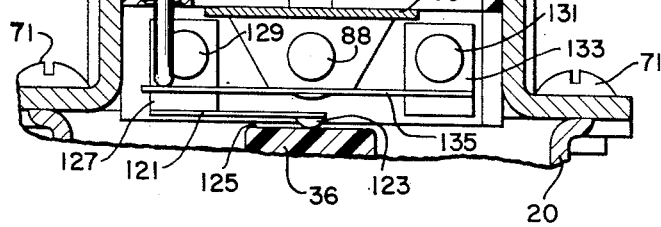
Figure 3 is a sectional view taken along the line 3—3 of Figure 1.
Figure 15:
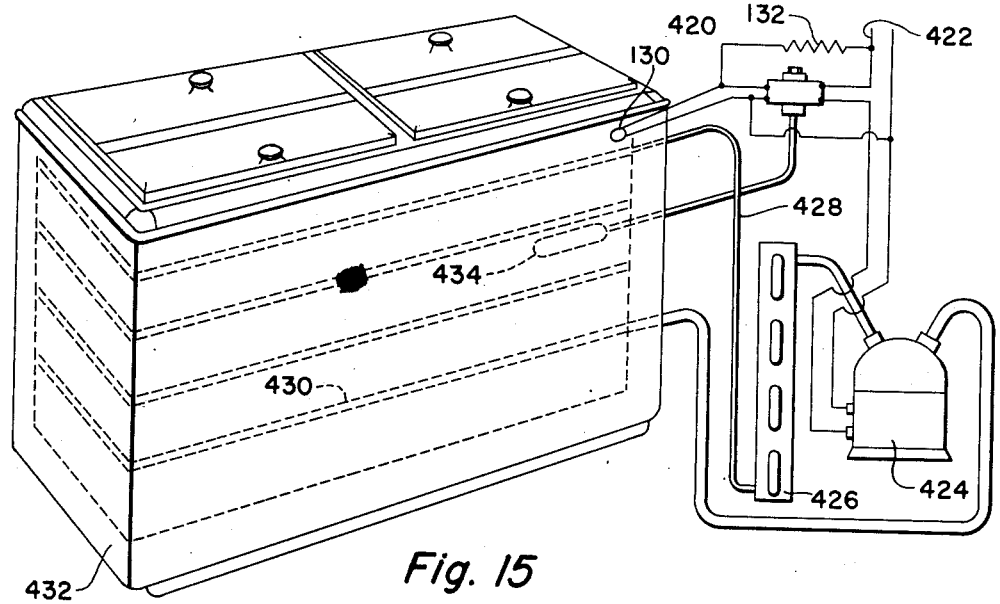
Figure 15 is a diagrammatic view of a home freezer or ice cream cabinet provided with another form of my improved control having an alarm switch.
Figure 19:
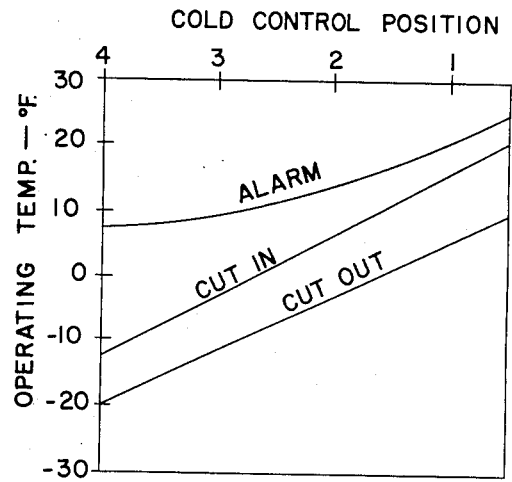
Figure 19 is a chart plotting temperatures for cut-in and cut-out and alarm closing and opening against cold control position for the switch as made and installed in the freezer shown in Figure 15.

When such a switch is made for use upon a home freezer or ice cream cabinet as illustrated in Figure 15, it is desired to provide a simple inexpensive means for indicating whenever the refrigerator temperature is above the safe limit as indicated by the alarm curve in Figure 19. For this purpose there is provided, as shown in Figure 3, a thin leaf spring contact arm 121 provided with a projection 123 adapted to rest upon a shoulder 125 provided on the follower 36 above the diaphragm 28. This spring arm has an upwardly extending projection 127 which is riveted to a terminal member 129 embedded in the terminal block 78. The alarm circuit is also provided with a second terminal 131 likewise embedded in the terminal block 78. Riveted to this terminal 131 is a projection 133 extending upwardly from the leaf spring contact arm 135 having a middle contact portion adapted to engage the adjacent portion of the arm 121. The arm 135 has an inherent spring bias upwardly which tends to hold the free end of the arm against the pin at the lower end of the adjusting screw 137. This adjusting screw 137 is threaded through the terminal block 78 as shown in Figure 3. The spring force of the arms 121 and 131 is very light so that the operation of the bellows follower 36 is substantially unchanged.

Under normal operation of the switch contacts 48 and 58 the contact arms 121 and 135 remain separated. The terminals 129 and 131 are connected to the opposite terminals of a small neon lamp 130 in a shunt arrangement. A high resistance 132 is connected in series with both to serve as a ballast resistance for the lamp 130. As long as proper temperatures are maintained, the lamp 130 will remain lighted. Should the temperature of the capillary tube 26 rise above the safe limit to the value indicated by the alarm curve in Figure 19, the pressure within the chamber enclosed by the diaphragm 28 will become sufficiently high to cause the diaphragm 28 to move upwardly and the contact arm 121 will be carried into engagement with the contact arm 135 to shunt and extinguish the lamp 130. A power failure will also extinguish the lamp 130. The lamp 130 will remain extinguished until the difficulty can be repaired or until other measures are taken to reduce the temperature to a safe value below that indicated by the alarm curve in Figure 19.

Figure 11:
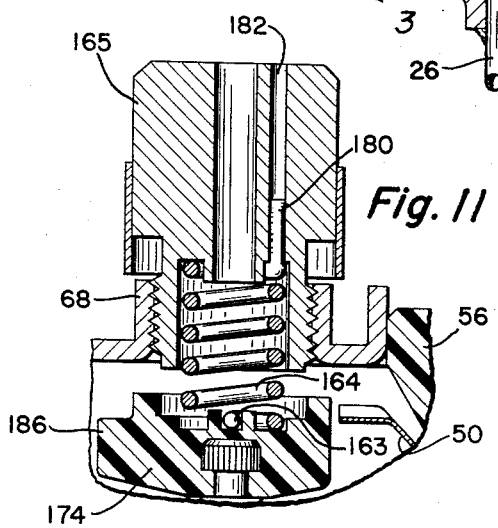
Figure 11 is a view showing a modified form of range adjusting mechanism.
Figure 2:
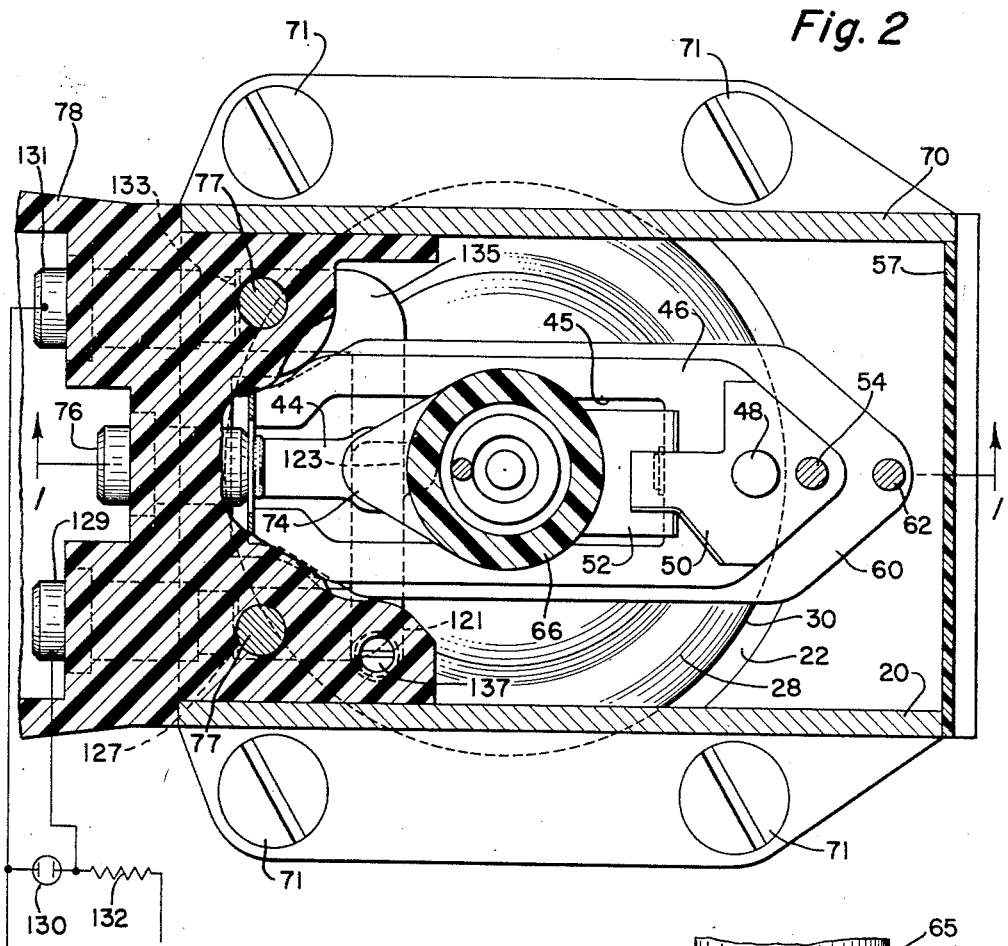
Figure 2 is a sectional view taken along the line 2—2 of Figure 1.

In Figure 11 there is shown a modified form of adjustment or control. In this form, the spring follower 174 is not connected to the adjusting screw 65 directly as shown in Figure 1, but the connection is made through the range spring 164. This range spring 164 has a bent end portion 163 which extends through a notch in the upper surface of the cam 174 as shown in Figure 11. The other end of the spring 164 is provided with an upwardly extending projection 180 which is held within an aperture 182 extending through the screw 165. The spring retainer 174 is provided with a camming projection 186 which will engage the bracket 50 in the same manner as shown in connection with Figures 1 and 2. The screw 165 threads into the flange threaded aperture 68 in Figure 11 in the same manner as the screw 65 threads in the aperture 68 in Figure 1.

Figure 12:
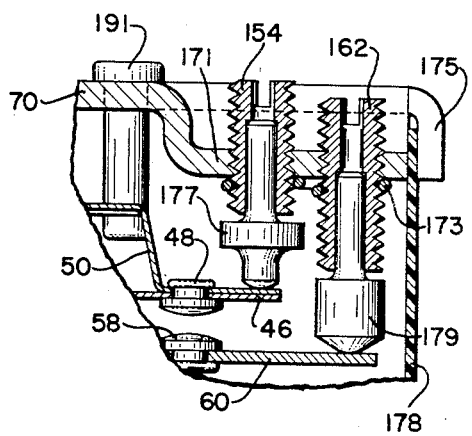
Figure 12 is a sectional view showing a modified form of differential adjustment.

In Figure 12 there is shown another modification. In this modification the top 70 is provided with a recess 171. The top 70 is also provided with a downwardly turned end flange 175 extending over and holding the end wall 178 which completes the enclosure of the switch by the various parts of the switch case. Threaded through the top 70 in the recess 171 are the screws 154 and 162. The wire member 173 is shown shaped like a U-shaped hook so as to provide a friction type of antiturning arrangement for holding the screws 154 and 162 in their proper places.

Since all of these parts are metal there is no means for preventing arcing between parts of the switch. The members 173 and 70 are good conductors. In order to prevent the top case 70 from being charged electrically, the pins on the lower ends of the screws 154 and 162 are provided with a vitreous electrical insulation insert such as glass or ceramic material designated by the reference characters 177 and 179. The glass or ceramic material is not materially affected by changes in moisture and temperature and it is hard and does not wear appreciably. It may be cemented or pressed into the recesses in the screws 154 and 162. This glass or ceramic material 177 and 179 insulates the top plate 70 and the screws 154 and 162 from the tongue 44 and the blade 46. A stop pin 191 extends through an aperture in the top plate 70 into the path of movement of the projection 74 as a substitute for the stop projection 55. It is made of any suitable electrical insulating material and is provided with a suitable head.

Figure 13:
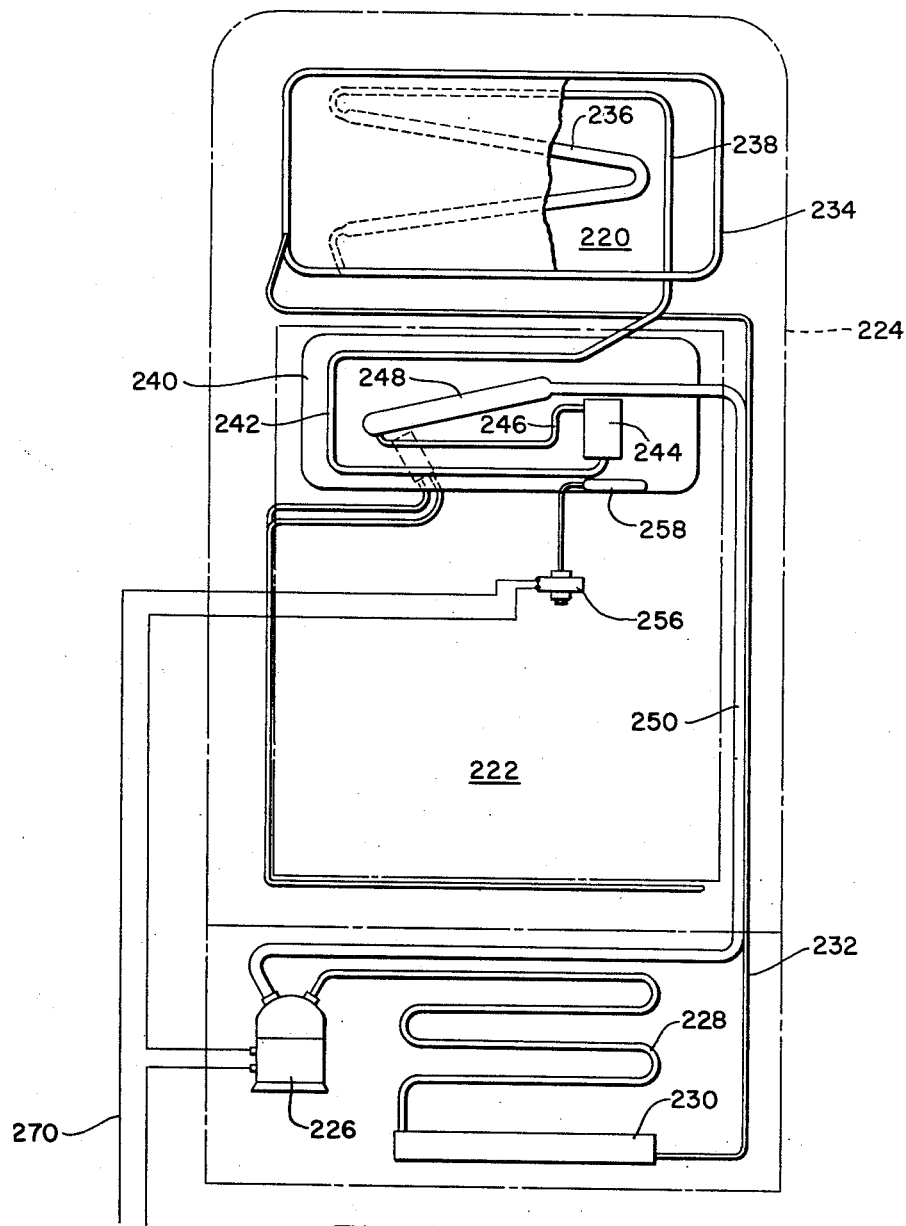
Figure 13 is a diagrammatic view of an improved two temperature refrigerator provided with an improved control and temperature adjustment.
Figure 18:
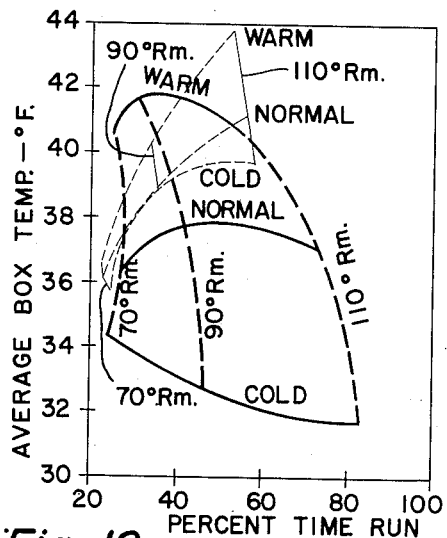
Figure 18 is a chart plotting average box or food compartment temperatures against percent run time in different room temperatures in different positions of range adjustment in full lines for the switch as made for and installed in Figure 13 as compared to the values shown in dotted lines for the constant cut in control previously installed in such a refrigerator.

When my improved switch with a diaphragm having a thickness of 0.010 inch is applied to the type refrigerator shown in Figure 13, it provides improved results as indicated by Figure 18. In this refrigerator there is provided a below freezing compartment 220 and an above freezing food storage compartment 222. These are insulated from each other and from the environment by suitable insulation provided in the cabinet 224. The cabinet is cooled by refrigerating system which includes a sealed motor-compressor unit 226 which delivers compressed refrigerant to a condenser 228 from which liquid refrigerant drains to the receiver 230. From the receiver 230, the liquid refrigerant is conducted to a capillary tube restrictor 232 to a freezing evaporator 234 which surrounds the freezing compartment 220 and is in direct heat exchange relation with the compartment 220.

The outlet of the freezing evaporator 234 connects to a bent disengaging tube 236, the upper portion of which is connected by a refrigerant conduit 238 to a vertical plate 240 located in the upper rear portion of the food compartment 222. This vertical plate includes a small refrigerant passage 242 extending across the top down one end and across the bottom portion of the plate with its end portion connecting with a small reservoir 244 also located in the plate 240. The top of this reservoir 244 is connected by a refrigerant passage 246 extending within the central portion of the plate 240 to the lower end of a centrally located inclined liquid disengaging passage 248. The upper portion of this liquid disengaging passage 248 is connected to the suction conduit 250 which in turn connects to the suction inlet of the motor-compressor unit 226.

Figure 20:
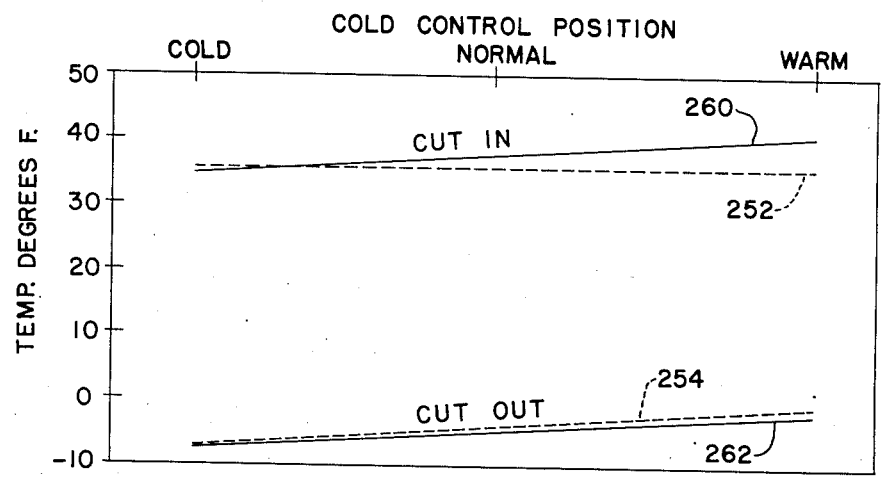
Figure 20 is a chart plotting temperatures against cold control positions shown in full lines for the switch as made and installed in Figure 13 as compared to the values shown in dotted lines for the constant cut-in control previously installed in such a refrigerator.
Figure 21:
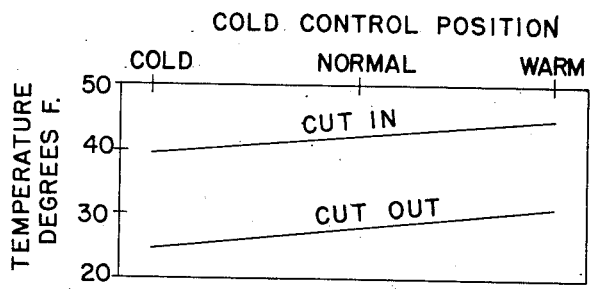
Figure 21 is a chart plotting temperatures against cold control position for the switch as made and installed in a water or beverage cooler.

Previously, this refrigerating system has been controlled by a switch having a constant cut-in as designated by the dotted line 252 in Figure 20 and has an adjustable switch opening temperature as indicated by the dotted line 254. Such a control resulted in the temperature curves indicated by the dotted lines in Figure 18. It will be seen that the adjustment had relatively no effect in a 70° F. room and a relatively small effect in the 90° F. room. Also, the box or unfrozen food compartment of the refrigerator became warmer as the room temperature rose from 70° F. to 110° F.

By employing my improved switch as designated by the reference character 256 in Figure 13 and placing the bulb portion 258 of the capillary tube in the same location on the plate 240 at the lower edge directly beneath the reservoir 244, an improved temperature regulation was obtained as indicated by the solid line curve designated "warm," "normal" and "cold" in Figure 18. The values in 70° F., 90° F. and 110° F. rooms are connected by dot and dash lines suitably indicated. It will be seen that the adjustment is effective in all room temperatures and that in any one setting the temperature regulation is improved and is kept within less than about 2° F. excepting in the cold position.

For this application, the switch is used with a diaphragm having a thickness of 0.010 inch and this results in a differential of 42° F. The threads upon the adjusting screw and in the flange opening 68 are made with fine threads having 40 turns to the inch so that the amount of adjustment is only about $\frac{1}{7}$ of the differential which amounts to about 6° F. This results in a cut-in or switch closing temperature as designated by the line 260 and a switch opening temperature as indicated by the line 262 in Figure 20. The switch 256 is connected in series with the supply conductor 270 which supplies the energy to one terminal of the sealed motor-compressor unit 226. The improved results with such a refrigerator may be obtained whenever a wide differential is used which is substantially constant and in which the adjustment is kept between about $\frac{1}{5}$ and $\frac{1}{10}$ of the differential.

Figure 14:
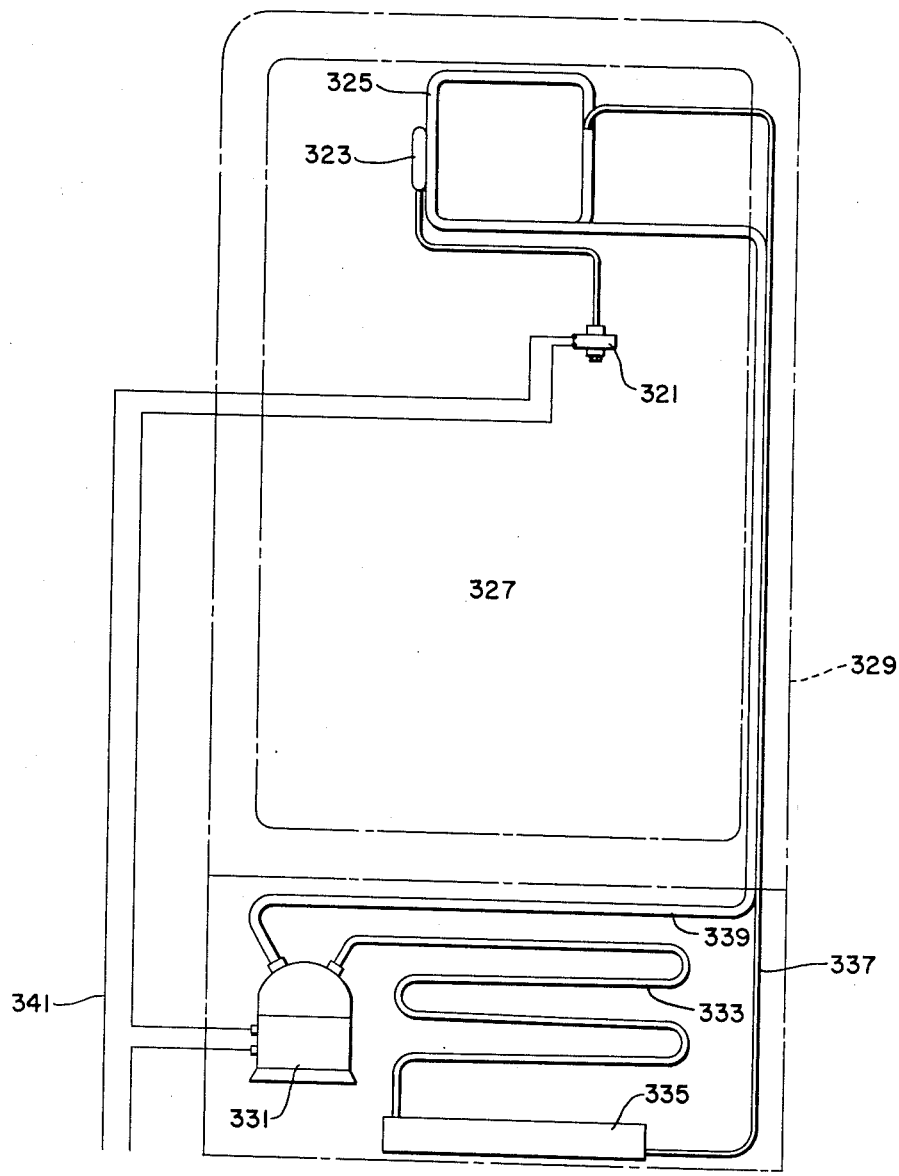
Figure 14 is a diagrammatic view of a conventional refrigerator to which is applied another form of my improved control.

For the application to a conventional household refrigerator as shown in Figure 14, a switch 321 provided with a diaphragm having a thickness of about 0.008 inch is used. The adjusting screw 65 and the flanged opening 68 are provided with a fine double thread having about 16 turns to the inch. The thermostat bulb 323 which constitutes the end portion of the capillary tube is mounted upon the side of the evaporator 325. The evaporator 325 is located in the upper portion of the food compartment 327. The food compartment 327 is located within an insulated cabinet 329. Beneath the cabinet there is provided a sealed motor-compressor unit 331, a condenser 333 and a receiver 335 which supply liquid refrigerant through the capillary restrictor tube 337 to the evaporator 325. The evaporated refrigerant is removed by the suction conduit 339 connecting the outlet of the evaporator 325 with the inlet of the compressor 331. The switch 321 is connected in series with supply conductor 341 connecting to the sealed motor-compressor unit 331.

Figure 17:
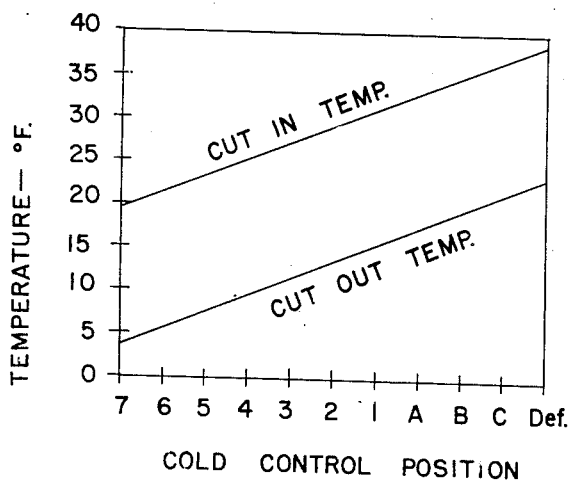
Figure 17 is a chart plotting switch temperatures for various positions of cold control for the switch as made in the installation in Figure 14.

When the switch 328 is made a diaphragm of 0.008 inch and provided with an adjusting screw 65 having sixteen turns to the inch it provides cut-in and cut-out temperatures in the various positions as indicated by the chart Figure 17. This provides satisfactory temperature regulation for the conventional refrigerator.

For the freezer cabinet shown in Figure 15, the switch 420 is similarly connected in series with the supply conductor 422 of the sealed motor-compressor unit 424. This sealed motor-compressor unit delivers compressed refrigerant to the condenser 426 from which liquid refrigerant is supplied through a capillary restrictor tube 428 to a tubular evaporator 430 which extends around the freezing compartment of the cabinet 432 as indicated in Figure 15. The switch 420 has its thermostatic bulb 434 extending in heat exchange relation with the inner wall of the freezing compartment of the cabinet between portion of the evaporator 430. This switch may be constructed with a diaphragm only 0.007 inch thick and is provided with a spring 64 having a greater force than the springs used for the switches 256 and 321. This provides a control having cut-in and cut-out temperatures according to the chart shown in Figure 19. The screw 137 is adjusted to provide engagement of the alarm contact members 121 and 135 at temperatures indicated by the alarm curve in Figure 19. The alarm contact members 121 and 135 may be connected in series with a signal light.

For a beverage or water cooler the switch may have its capillary tube charged with dichlorodifluoromethane (F-12) and be provided with a diaphragm having a thickness of 0.006. This will provide temperature regulation according to the chart shown in Figure 21.

Figure 16:
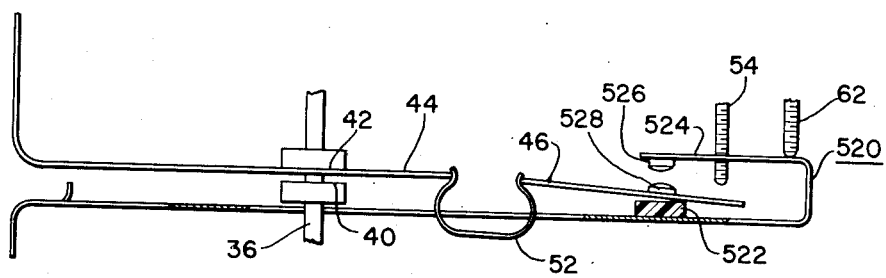
Figure 16 is a diagrammatic view of a modified form of snap-action mechanism with a reversed contact mechanism.

Figure 16 shows a modification wherein the switch may be used for controlling a heating device instead of a cooling device. In this arrangement, the tongue 44 and the blade 46 as well as the bellows follower 36 may be substantially unchanged. The other parts of the switch may be likewise substantially unchanged excepting for the contact blade 60 which is replaced by a different contact blade 520. This contact blade 520 differs from the contact blade 60 only in that a member of electrical insulating material 522 replaces the contact 58 and the end portion of the blade is provided with a hook-shaped portion 524. The end of this hook-shaped portion 524 carries on its lower face a switch contact 526. The switch contact 48 is replaced by an upwardly facing contact 528 to make engagement with the contact 526. The hook portion 524 has an aperture through which extends the lower portion of the adjusting screw 54. The adjusting screw 62 is made shorter and engages the hook-shaped portion 524 of the member 520. The diaphragm chamber and capillary tube system may be charged with different fluids so as to enable the switch to operate in different temperature ranges for heating purposes as well as for other refrigeration applications.

Instead of the diaphragm 34 and its followers, either the tongue 44 or the blade 46 or both may be of bimetal arranged to bow toward each other upon an increase in temperature. Thus, I have provided a switch which is easy to manufacture and assemble which with slight changes in parts may be used for a wide variety of heating and cooling applications. The active elements of the switch are fully enclosed and are not materially affected by rough handling since they are all protected by the strong outer enclosure of the switch.

While the form of embodiment of the invention as herein disclosed constitutes a preferred form, it is to be understood that other forms might be adopted as may come within the scope of the claims which follow.

What is claimed is as follows:

1. A control including first and second cantilever spring blades, a toggle spring extending between the adjacent end portions of the blades, one of said blades being provided with a contact portion, an adjusting means for limiting the one direction of movement of said contact portion, a cooperating contact means for limiting the opposite direction of movement of said contact portion spring means urging said cooperating contact means toward said contact portion and a second adjusting means for limiting the movement of said cooperating contact means toward said contact portion.

2. A control including first and second cantilever spring blades, a toggle spring extending between the adjacent end portions of the blades, one of said blades being provided with a contact portion, an adjusting means for limiting the one direction of movement of said contact portion, a cooperating contact means for limiting the opposite direction of movement of said contact portion, and a second adjusting means for adjusting the position of said cooperating contact means, and a diaphragm means having a lost motion connection with one of said blades.

3. A control including first and second cantilever spring blades, a toggle spring extending between the adjacent end portions of the blades, one of said blades being provided with a contact portion, an adjusting means for limiting the one direction of movement of said contact portion, a cooperating contact means for limiting the opposite direction of movement of said contact portion, and a second adjusting means for adjusting the position of said cooperating contact means, and a diaphragm means having a follower provided with a connection with one of said blades, said follower being provided with a projection, and a switch contact means located in the path of said projection beyond the normal range of movement but within the maximum range of movement of said projection.

4. A control including first and second cantilever spring blades, a toggle spring extending between the adjacent end portions of the blades, one of said blades being provided with a contact portion, a cooperating contact means for limiting the one direction of movement of said contact portion, said one blade being provided with an inherent spring bias in the direction of said cooperating contact means sufficient in itself to provide more than the minimum adequate contact pressure beween said contact portion and said cooperating contact means.

5. A control including first and second cantilever spring blades, a toggle spring extending between the adjacent end portions of the blades, one of said blades being provided with a contact portion, a cooperating contact means for limiting the one direction of movement of said contact portion, said one blade being provided with an inherent spring bias in the direction of said cooperating contact means sufficient in itself to provide more than the minimum adequate contact pressure between said contact portion and said cooperating contact means, a motor, and a lost motion connection between said motor and said other blade.

6. A control including first and second cantilever spring blades, a toggle spring extending between the adjacent end portions of the blades, one of said blades being provided with a contact portion, a cooperating contact means for limiting the one direction of movement of said contact portion, said one blade being provided with an inherent spring bias in the direction of said cooperating contact means sufficient in itself to provide more than the minimum adequate contact pressure between said contact portion and said cooperating contact means, the other blade being provided with an inherent spring bias away from said other blade.

7. A control including first and second cantilever blades, a toggle spring extending between the adjacent end portions of the blades, one of said blades being provided with a contact portion, a third cantilever spring blade provided with a contact portion adapted to cooperate with the other contact portion and having an inherent spring bias toward the other contact portion, and an adjusting screw for limiting the movement of said third blade toward said other contact portion.

8. A control including an operating means, a movable contact means and a second contact means adapted to be contacted by said movable contact means, snap-acting toggle means connecting said operating means and said movable contact means, spring means for modifying the operation of said operating means, a rotatable adjusting means for said spring means, said movable contact means being provided with an operating arm, said rotatable adjusting means being provided with a cooperating arm rotatable coincidentally with the adjusting means in a path bringing it into engagement with said operating arm, said cooperating and operating arms having coacting engaging surfaces for moving and holding said movable contact means away from the second contact means.

9. A control including an operating means, a movable contact means and a second contact means adapted to be contacted by said movable contact means, snap-acting toggle means connecting said operating means and said movable contact means, spring means for modifying the operation of said operating means, a spring retainer of electrical insulating material for holding said spring means, a metal adjusting screw for axially adjusting said spring retainer, and a toothed multi-position clutching arrangement between said spring retainer and said adjusting screw.

10. A control including an operating means, a movable contact means and a second contact means adapted to be contacted by said movable contact means, snap-acting toggle means connecting said operating means and said movable contact means, a spring arm extending along the operating means and the movable contact means and having a hook-shaped end portion extending around said movable contact means to the opposite side thereof and having said second contact means fastened to the part of the hook-shaped end portion on the opposite side thereof so located as to be engaged by said movable contact means.

References Cited in the file of this patent

UNITED STATES PATENTS

| | | |
|---|---|---|
| 2,578,906 | Tobey | Dec. 18, 1951 |
| 2,639,352 | Watson | May 19, 1953 |
| 2,640,313 | Cobb | June 2, 1953 |
| 2,640,327 | Alsing | June 2, 1953 |
| 2,658,121 | Gray et al. | Nov. 3, 1953 |
| 2,671,838 | Senn | Mar. 9, 1954 |
| 2,671,839 | Cox | Mar. 9, 1954 |
| 2,691,084 | Miller | Oct. 5, 1954 |